July 3, 1956

C. G. GORDON ET AL 2,753,134

AIRCRAFT CONTROL SYSTEM

Filed March 10, 1952

INVENTORS
CARROLL G. GORDON
ROBERT D. WALLACE
BY LOUIS E. BERTHELSON

*William R. Lane*

ATTORNEY

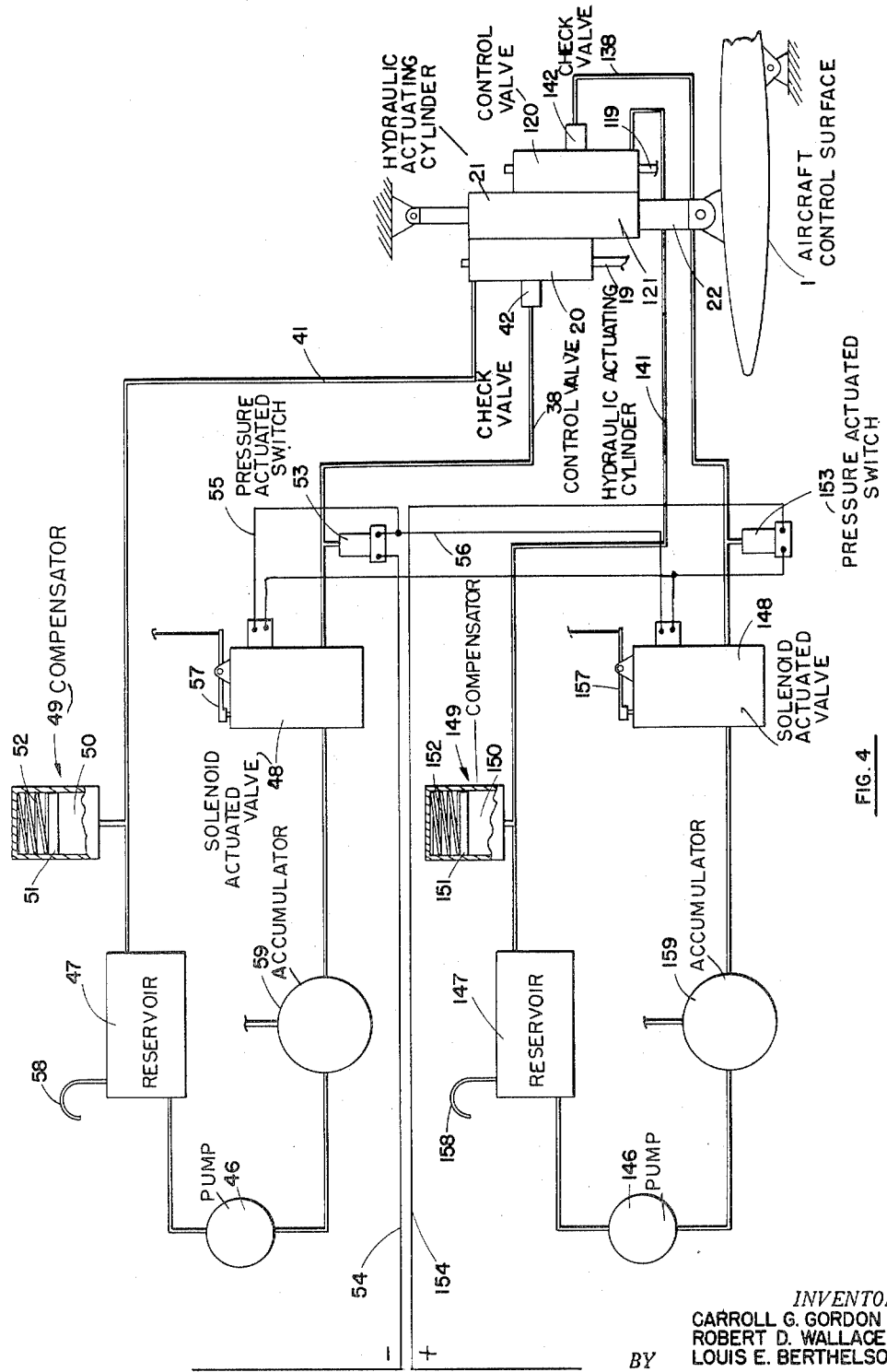

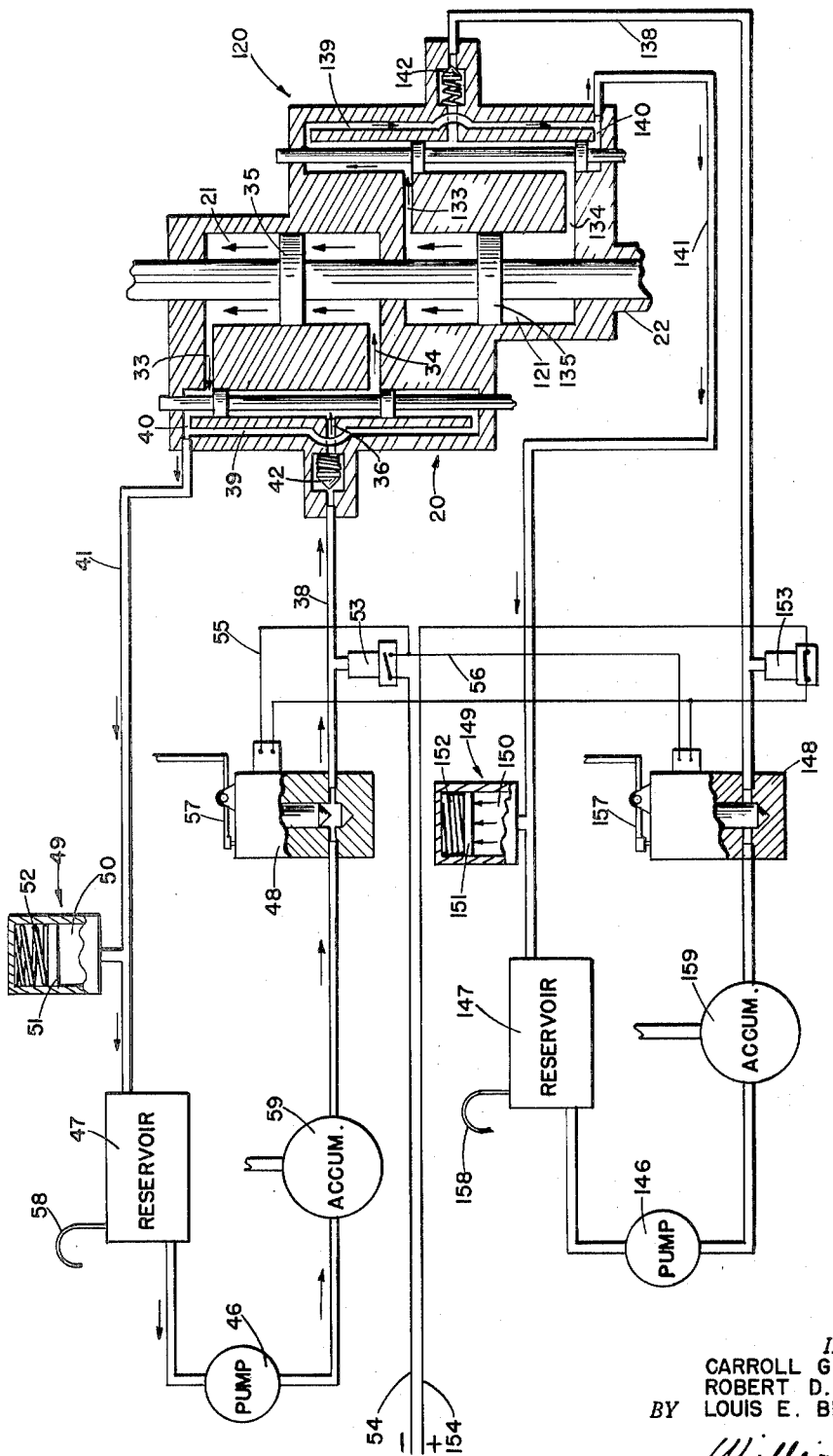

July 3, 1956

C. G. GORDON ET AL 2,753,134

AIRCRAFT CONTROL SYSTEM

Filed March 10, 1952

INVENTORS
CARROLL G. GORDON
ROBERT D. WALLACE
BY LOUIS E. BERTHELSON

William P. Lane

ATTORNEY

United States Patent Office 2,753,134
Patented July 3, 1956

2,753,134

AIRCRAFT CONTROL SYSTEM

Carroll Gary Gordon, Pasadena, and Robert D. Wallace and Louis E. Berthelson, Los Angeles, Calif., assignors to North American Aviation, Inc.

Application March 10, 1952, Serial No. 275,698

4 Claims. (Cl. 244—85)

This invention pertains to an aircraft control system and more particularly to a control system adaptable for an aircraft having a wide range of speed.

The advent of modern high speed aircraft which achieve speeds in the transonic range and beyond has introduced aircraft control problems rendering conventional controls entirely inadequate. Forces to operate the controls become so great at these high speeds that an ordinary manual control system cannot successfully be utilized. Ordinary power boost systems are also deficient for such speeds because they feed back to the pilot's control stick a certain portion of the force necessary to operate the control surface. Variation in force necessary to actuate a control surface in these ranges is so great that if sufficient force is fed back to the pilot to provide him with appreciable feel at slower speeds, such as for landing and take-off, the forces fed back at high speeds will be so large that any movement of the controls becomes very difficult. These conventional systems are also inadequate in that upon failure of the power system the control linkage must then be manually operated by the pilot. Another fault that has become apparent in conventional control systems is the inadequacy of a conventional elevator connected with a conventional fixed horizontal stabilizer. These elevators, although functioning satisfactorily at slow speeds, lose effectiveness at high Mach numbers. At slow speeds elevator deflections will produce pressure changes over the whole tail so that stabilizer surfaces make large contributions to tail lift. However, as sonic speed is approached compressibility effects and shock formations mean that elevator deflections will not produce changes in lift over the entire tail surface. This is because shock wave formation near the rear of the tail will block off transmission of pressure changes forwardly from the elevator, and because the boundary layer around the elevator will separate resulting in loss of lift. As a result, the elevator efficiency drops greatly at high speeds and the airplane loses maneuverability.

It is therefore an object of this invention to provide an aircraft control system adaptable for high speed aircraft.

Another object of this invention is to provide a control system that is completely power operated and irreversible in its characteristics.

Still another object of this invention is to provide a control system that incorporates means to give the pilot artificial feel indicating operation of the control members.

Yet another object of this invention is to provide a control system which includes an alternate emergency means of control that is power operated.

A still further object of this invention is to provide a control system in which the entire horizontal tail surface is moveable.

An additional object of this invention is to provide a control system that is sensitive in its operation and that will provide maximum maneuverability and safety of aircraft operation.

These and other objects will become apparent from the following detailed description taken in connection with the accompanying drawings in which—

Fig. 4 is a diagrammatic view of the two hydraulic systems;

Fig. 5 is a schematic view illustrating the hydraulic fluid flow and the wiring connections for movement of the actuating cylinder in one direction by the normal control system.

Figures 1, 3:
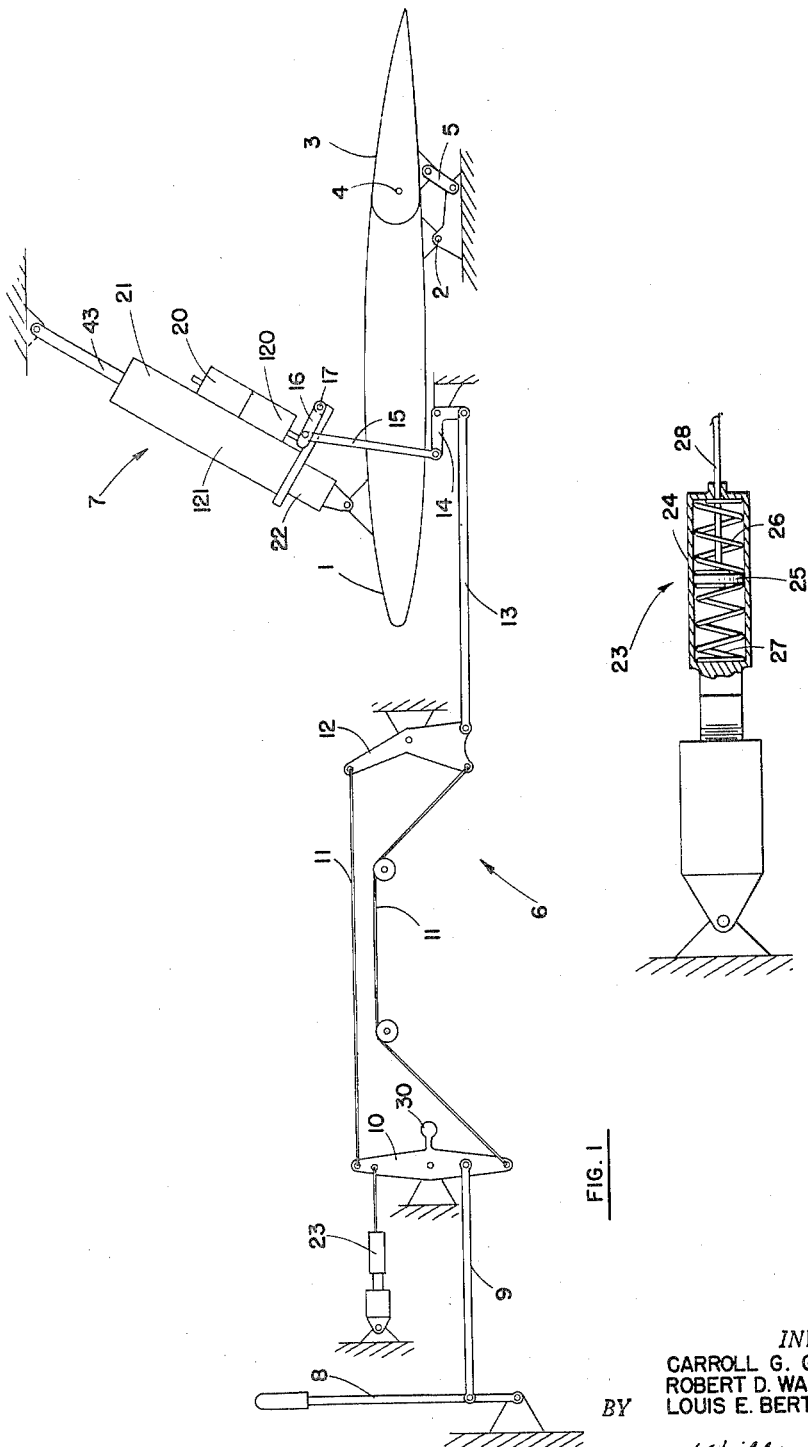
Fig. 1 is a schematic view of the control linkage, actuator and tail surface.
Fig. 3 is a detail, partially in section, of the artificial feel bungee.

Referring to Fig. 1 of the drawings, an aircraft adapted for high speed operation may include a control surface such as tail 1 mounted on the fuselage. According to the teachings of this invention this tail surface is wholly moveable, being pivotally mounted on the fuselage by a suitable means such as pin or shaft 2, which has its axis substantially perpendicular to the line of flight of the aircraft. The entire horizontal tail surface may be pivoted about shaft 2 without the use of any elevators or other additional control means. An all moveable tail surface such as the one illustrated provides important advantages at high speed operation. The tail surface will be much less adversely affected by shock formations, and small deflections of the control surface will produce uniform and high lift variations over the entire surface.

It may be desired to provide an elevator 3 with the moveable tail surface and this elevator may be pivoted to the tail member about shaft 4 and connected through link 5 to portions of the airplane structure. In this manner, pivotal movement of tail member 1 will automatically provide pivotal movement of elevator 3 in the opposite direction.

To operate control surface 1 a control linkage 6 is connected with actuating means 7 which in turn pivots the control surface. Linkage 6 may include a pilot-operated control stick 8, pivotally mounted in the aircraft, which connects through forward link 9 to forward bellcrank 10, also pivotally mounted. Cables 11 connect bellcrank 10 to pivotally mounted aft bellcrank 12 which is connected by rod 13 to crank 14. Rod 15 connects the other end of crank 14 to arm 16 keyed or otherwise fixed on shaft 17. Also keyed or otherwise fixed to shaft 17 is arm 18 engaging valve slider shaft 19 of the actuating means. Thus it is apparent that pivotal movement of control stick 8 will act through linkage 6 to cause linear movement of shaft 19 of actuating means 7. It should be noted that any suitable linkage may be used for enabling the pilot to operate the actuating means and that the linkage illustrated and described constitutes the preferred embodiment only.

Figure 2:
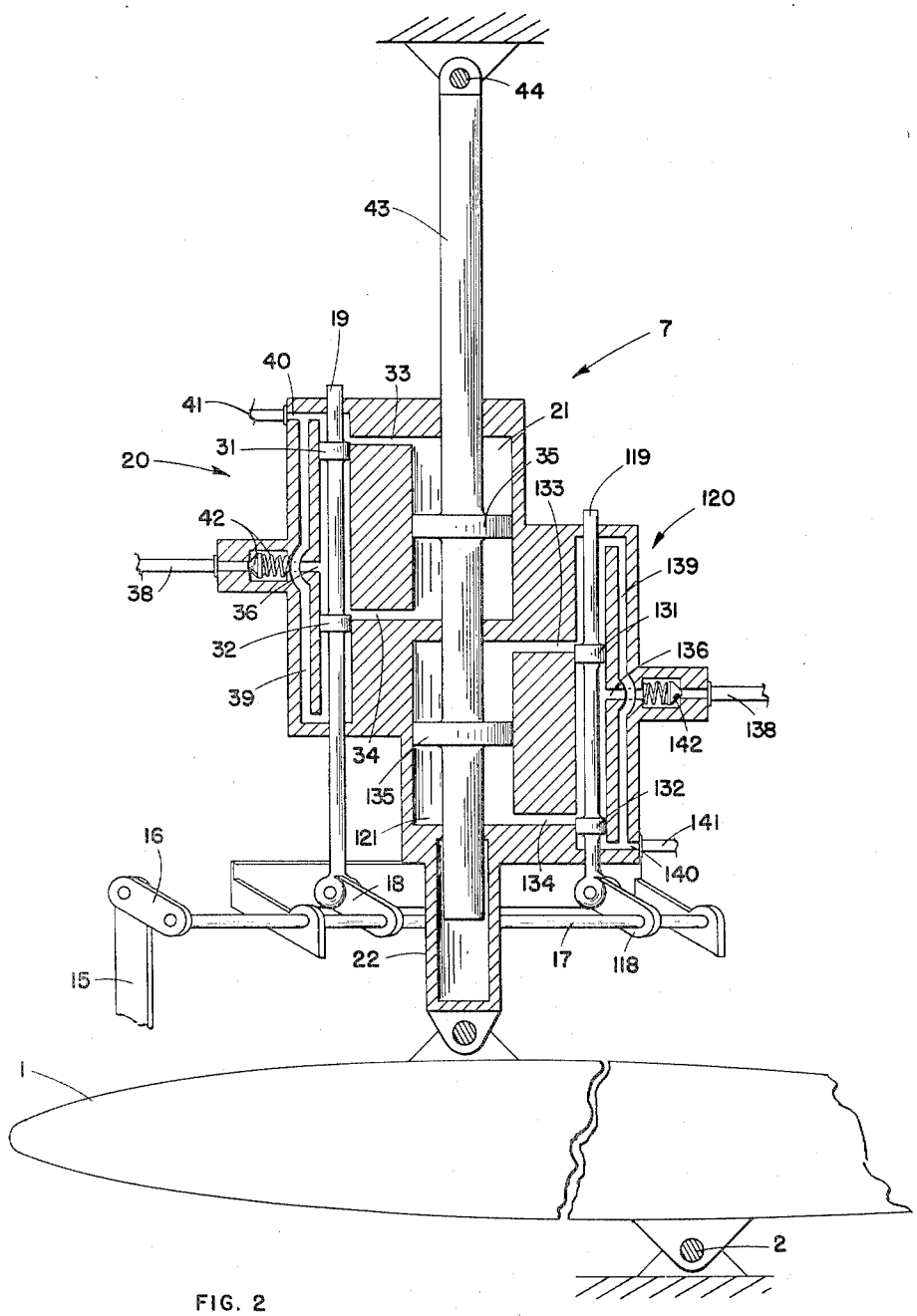
Fig. 2 is a sectional view of the actuating cylinders and control valves with the control valves separated for purposes of clarity.

Actuating means 7 includes a control valve 20 which is carried by and connects with hydraulic actuating cylinder 21 which is connected to control surface 1 through cylinder body portion 22 as best seen in Fig. 2. The control valve directs the admission of pressurized fluid into cylinder 21 which causes movement of the cylinder thereby affecting pivotal movement of the control surface, all of which is more fully set forth hereinafter. Control valve 20 is balanced, as will be made apparent, so that no forces from the pressurized hydraulic fluid or from the control surface are transmitted to the valve. This means that in operating the linkage the pilot will meet with practically no resistance in actuating the control valve, and it is therefore necessary to provide the pilot with an artificial feel means so that he can determine the relative displacement of the control linkage and thus of the control valve and the control surface. In the preferred embodiment of this invention this artificial feel is supplied by means of a bungee unit 23 which is connected in the control linkage at some suitable place such as on forward bellcrank 10. Fig. 3 illustrates the workings of the bungee unit which may include cylindrical body 24 in which disc 25 is yieldably positioned between compression springs 26 and 27. Disc 25 is attached to bellcrank 10 through rod 28 slidably passing through one end of body 24. The other end of the bungee body is secured to portions of the aircraft structure. This means that when the control stick 8 is moved, thus actuating the control linkage and deflecting bellcrank 10, bungee spring 26 or 27, depending upon the direction of movement, will be deflected which will transmit a resistance force to the pilot proportionate to the amount of displacement to the control linkage and thus of the control valve. In this manner the pilot is provided with a feel force enabling him to satisfactorily determine the position of the control surface 3. This force can be of any desired value by proper selection of the bungee springs.

To provide an additional force in the control linkage proportionate to the gravitational force on the aircraft a bobweight 30 may be included and attached to forward bellcrank 10. When the airplane is subjected to a gravitational force, as for example when pulling out of a dive, the force of gravity will pull downwardly on the bobweight, providing an additional resistance to the operation of the control stick. This additional resistance to the pilot enables him to discern changes in "G" with more uniformity for all airplane speeds and altitudes. It should be understood that additional means could be provided for supplying the artificial feel force, such as, for example, a torsion spring, a leaf spring or other resilient means, and that variable force could be readily fed into this artificial feel system without departing from the spirit and scope of this invention.

The structure and operation of the actuating means may best be understood by reference to Fig. 2. Control valve 20 may be of the spool type wherein slide 19 is provided with two enlarged portions 31 and 32. Slide 19 is connected through shaft 17 to the control linkage as described above, and reciprocates within the valve body upon movement of the control linkage. Enlarged portions 31 and 32 cooperate with access ports 33 and 34 which communicate with cylinder 21 on either side of piston 35. The control valve is also provided with inlet port 36 which admits pressurized fluid through inlet line 38 to the valve. The valve body is provided with a passage 39 and also includes outlet port 40 leading to outlet line 41. The inlet to the valve is provided with a check valve 42 which may be of the simple spring loaded type admitting fluid flow only into the control valve.

It may be seen thus far that if the control valve slide is moved to the position illustrated in Fig. 2, fluid under pressure from inlet line 38 may flow past check valve 42 into the space between enlarged portions 31 and 32 through port 34 and into the bottom side of cylinder 21 beneath piston 35. This pressurized fluid will then exert a force within the cylinder which, because piston 35 is secured to rod 43 which is attached outside of cylinder 21 at 44 to portions of the aircraft structure and is thus axially fixed, will force the entire cylinder assembly downwardly. Since portion 22 of the cylinder assembly is connected to the control surface 1, pivotal movement of the control surface will result. As the cylinder moves downwardly, and if the valve slide is held stationary by the control linkage, the control valve will be repositioned relative to the slide to a neutral position so that enlarged portions 31 and 32 cover ports 33 and 34 thus shutting off flow to and from cylinder 21 and arresting further movement of the control surface. As the cylinder moves, and before the ports are shut off by the slide member, fluid may be discharged from the upper portion of cylinder 21 through port 33, port 40 into outlet line 41. The operation is similar if the control slide is moved upwardly (instead of downwardly as illustrated) so that fluid may be admitted to the upper portion of cylinder 21 through port 33 in which case cylinder 21 will move upwardly. In the latter case as fluid discharges from the lower portion of the cylinder through port 34 it will pass through passageway 39 in order to reach the return line. It should be observed that the middle portion of the valve between enlarged portions 31 and 32 is always subjected to pressurized fluid from inlet port 36, while the outer ends of enlarged portions 31 and 32 are always subjected to the return pressure in passage 39. In this manner the valve is perfectly balanced and need not work against any fluid pressure. It should also be noted that check valve 42 will prevent any reverse flow through the system should a force be exerted on the control surface tending to reverse the direction of the movement of the hydraulic cylinder. In this manner the system is made completely irreversible and no control surface forces are transmitted to the pilot.

The hydraulic system for operating the cylinder is a completely closed system as shown in Fig. 4. A pump 46 is connected with fluid reservoir 47 and delivers pressurized fluid to inlet line 38 leading to control valve 20. A suitable valve 48 may be included in the pressure line for opening or shutting off access from the pump to the control valve. Return line 41 connects the control valve to reservoir 47 and is provided with a compensator 49. This compensator may comprise a reservoir portion 50 with a piston 51 reciprocable therein and biased downwardly by means of spring 52. One function of this compensator is to accommodate expansion or contraction of the fluid in the system as changes in temperature take place or as fluid may be lost from the system. Thus the piston will rise within the reservoir portion of the compensator if the fluid expands, or the piston will be forced downwardly by the spring to compensate for any fluid volume loss that might take place.

As a safety factor this aircraft control system is provided with an auxiliary hydraulic system which duplicates in many respects the normal system just described and which is also connected to the operating linkage and serves to actuate control surface 1. Elements of the alternate system corresponding to those in the normal system will be given corresponding numbers with the prefix 1 added. The alternate system includes a control valve 120 provided with a slide 119 connected through arm 118 to shaft 17 and control linkage 6. The auxiliary control valve includes inlet port 136, a check valve 142 and ports 133 and 134 leading into cylinder 121 on either side of piston 135 secured to shaft 43. Enlarged portions 131 and 132 on slide 119 control the admission of pressurized fluid to hydraulic cylinder 121, and the control valve is provided with passageway 139 and outlet port 140. The function of control valve 120 and piston 135 in actuating control surface is in every way the same as that described above for the normal system for which reason no detailed description will be given. The alternate hydraulic system includes a second reservoir 147, a source of fluid pressure such as pump 146, and shut-off valve 148 in inlet line 138. Outlet line 141 is connected with outlet port 140 of the alternate control valve and leads to compensator 149 and thence to the alternate system reservoir. The alternate system compensator is similar to the normal system compensator, includes piston 151 within reservoir portion 150 biased by spring 152.

It is thus apparent that this aircraft control system provides two operable means for effecting pivotal movement of control surface 1, the control valves of both of which are simultaneously operated by the control linkage. In order that one system may operate the control surface while the other system serves as an emergency reserve system, the source of pressure in one or the other must be shut off from access to the control valve. Thus shut-off valve 48 may be opened thereby admitting pressurized fluid through line 38 into normal control valve 20, while shut-off valve 148 should then be closed preventing admission of pressurized fluid into control valve 120. To provide automatic changeover from one system to the other valves 48 and 148 may be of the solenoid type. A pressure opened switch 53 may be connected in pressure line 38 and a source of electrical energy, such as a battery, connected through wire 54 to the pressure switch, which is in turn connected through wires 55 and 56 to the two valve solenoids. Pressure switch 53 may be of the conventional type responsive to predetermined pressure in line 38. Thus an arrangement may be provided so that when the normal system pressure is above a predetermined critical value, valve 48 will be held open to allow operation of the normal system, and valve 148 will be closed to cut off the auxiliary system. For this arrangement solenoid valve 48 is the type which is closed when the solenoid is energized while valve 148 is opened upon energization of its solenoid. If the normal system pressure then falls below the predetermined critical value the pressure switch will allow energization of the solenoid valves so that valve 48 in the normal system will close and valve 148 in the alternate system will open simultaneously in order that the alternate system may take over operation of control surface 1. If desired an additional pressure closed switch 153 may be provided in the alternate system connected through wire 154 with the source of electrical energy and also connected with the two solenoid valves for similarly causing the alternate shut-off valve to close and the normal system valve to open for returning operation of the control circuit to the normal system. Pressure sensitive switch 153 is set to operate at a much lower pressure than switch 53 so that it remains closed not only when the alternate system is in operation but also (from residual pressure) when this system is disconnected. Complete failure in the alternate system, however, resulting in virtually zero pressure in line 138, will cause switch 153 to open thereby deenergizing solenoid valves 48 and 148 returning control to the normal system. It is also normally desirable to provide a manually operable switch to cause actuation of valves 48 and 148, and in addition to provide manual control arms 57 and 157 for the two valves to be used in case of electrical failure.

When one system is being used, some provision must be made for allowing the other system to displace fluid from its actuating cylinder so as to prevent a fluid lock in the system. Thus, for example, if the normal system is being actuated there must be some provision for the fluid that is displaced by piston 135 in cylinder 121 of the alternate system. To accomplish this, compensator 149 performs a second function in addition to its compensation for expansion or contraction of the fluid volume within the system due to temperature change. Thus as cylinder 21 moves downwardly from the position illustrated in Fig. 2 with the control valves as there shown fluid may escape from cylinder 121 through port 133, passage 139, port 140, and into outlet line 141. This additional amount of fluid in the outlet line will act upon piston 151 in the compensator and overcome the force of spring 152 thus shifting the piston within the compensator so that reservoir portion 150 of the compensator is increased in volume, and so that the additional fluid may be accommodated within the compensator. If the control valve is then moved upwardly so that port 134 is open to outlet line 141, and so that the cylinder then moves upwardly, fluid remaining in cylinder 121 below piston 135 will be discharged through port 140, line 141 and into the compensator. The alternate system will thus empty cylinder 121 of operating fluid and pull a vacuum while the normal system is operating the control surface, but this has no adverse effect because pump 46 may be constructed so as to supply adequate pressure to cylinder 21 to overcome any such resistance in the alternate system cylinder. If the capacity of compensator 149 should be exceeded for any reason the excess fluid may be discharged from the system through drain 153 on reservoir 147. If valves 48 and 148 are then changed over so that the alternate system is brought into operation, compensator 149 will then return the fluid it had accepted from cylinder 121 to reservoir 147, pump 146 and back to cylinder 121. The compensator thus assures that the reservoir and pressure lines are always full of fluid. When the auxiliary system is operating the control surface the action of normal system compensator 49 is the same as that of compensator 149 when the normal system was in operation. Reservoir 47 is equipped with drain 58 to dispose of any excess fluid.

Figure 6:
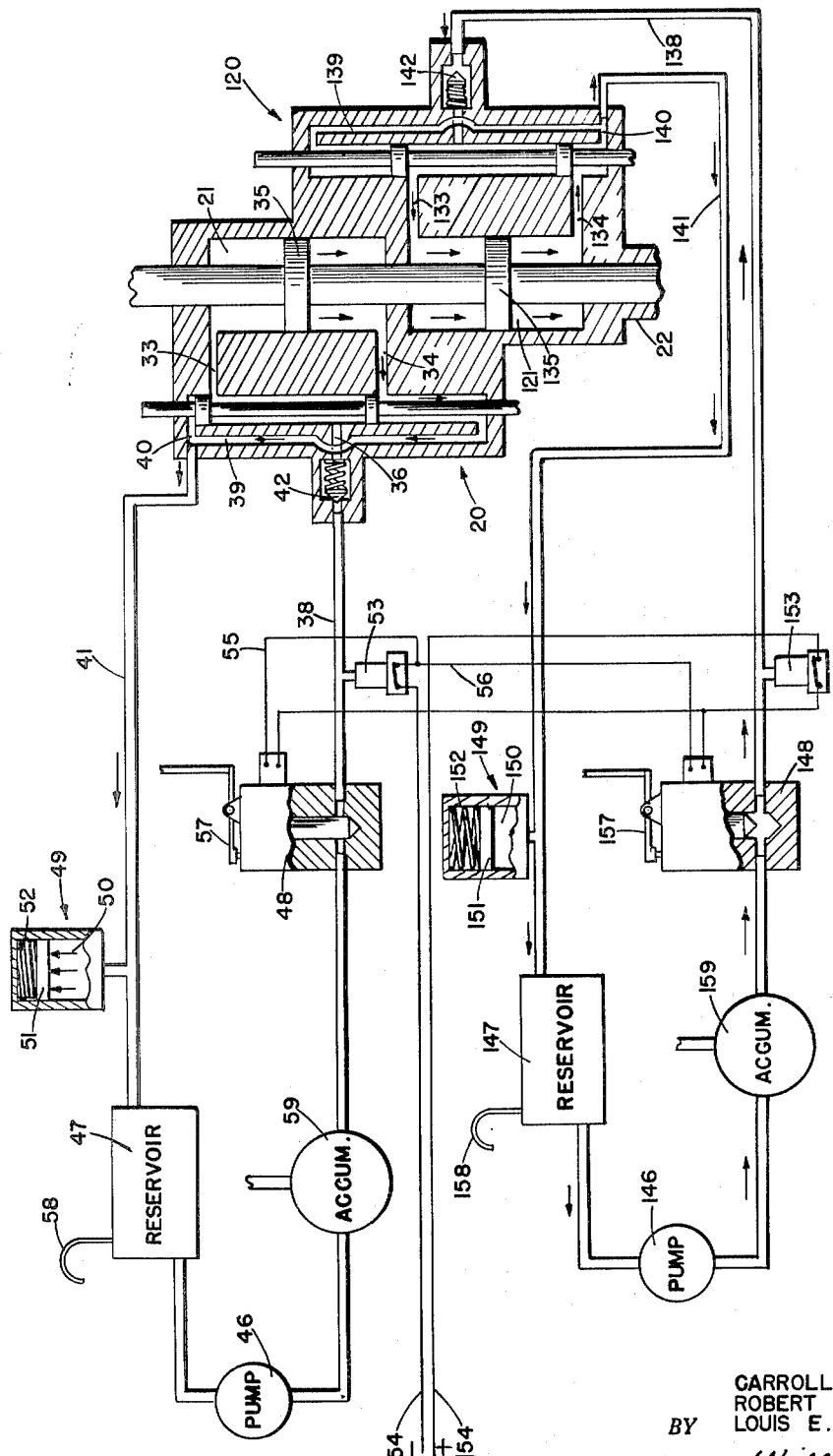
Fig. 6 is a schematic view similar to Fig. 5 illustrating movement of the cylinder by the alternate system in the opposite direction.

The specific operation of the various components of the control system may be seen by reference to Figs. 5 and 6 where the fluid flow is indicated by arrows. As shown in the former, when the normal system is in operation solenoid valve 48 is open allowing flow of fluid through inlet 38 to control valve 20. Switch 53 is maintained in an open position from this pressure in the line, so that current cannot flow from conductor 54 to conductor 55 which leads to the solenoids. Therefore, the solenoids are deenergized which holds valve 48 open and valve 148 closed. With the control valves in the position shown, the fluid in the normal system passes through check valve 42 and port 34 to the portion of cylinder 21 beneath piston 35. This forces the cylinder downwardly relative to this piston and displaces fluid out of the upper portion of cylinder 21 through discharge port 40 to recirculate through line 41. As cylinder 121 is also moved downwardly, fluid above piston 135 discharges from cylinder 121 through port 133, passageway 139 and outlet 140. The fact that valve 148 is closed prevents circulation of fluid through the alternate system reservoir, pump and accumulator to the inlet side of control valve 120. However, as indicated by the arrows, the fluid displaced by movement of cylinder 121 enters compensator 149 overcoming the force of spring 152 to displace the piston in the compensator upwardly. This permits the normal hydraulic system to operate without fluid lock in the alternate system. Note that switch 153 in the alternate system is closed while the normal system is in operation as a result of the pressure trapped between spring loaded check valve 142 and shut off valve 148. Only in the event of complete failure in line 138 will switch 153 be opened.

Fig. 6 illustrates the opposite movement of the actuating cylinder, in this instance caused by pressurized fluid engaging the upper surface of piston 135, thereby displacing the actuating cylinders upwardly. As shown in this figure, switch 53 is closed as a result of reduction of pressure in line 38. When this occurs the circuit is completed through switch 53 to conductor 55 and solenoid valve 48 current also flows to solenoid valve 148, switch 153 and through return wire 154. This energizes the solenoids of valves 48 and 148 thereby closing the former and opening the latter. With the control valve in the position illustrated pressurized fluid enters port 136 and passes through port 133 to cylinder 121 on the upper side of piston 135. As the cylinder is thereby displaced upwardly relative to the piston, the fluid on the underside of this piston is displaced through port 134, outlet port 140 and into return line 141 where it may be recirculated. Fluid lock is prevented by fluid from the underside of piston 35 being forced out through port 34, passageway 39, outlet 40 and line 41 into compensator 49 where the piston 51 is moved upwardly against spring 52.

From the foregoing it may be clearly seen that regardless of the position of the control valves or despite which system is in operation fluid lock will be prevented while automatic changeover from the normal to the alternate system is effected by a reduction in pressure in the normal system. Complete failure in line 138 of the alternate system causes the opening of switch 153 in that system, thereby de-energizing the solenoid valves and returning operation to the normal system.

To provide additional pressure capacity in the systems so as to assure operating pressure and to accommodate sudden pressure drain, accumulators 59 and 159 may be provided in pressure lines 38 and 138. These accumulators may be of any desired type such as the usual pressure charged container that will force additional fluid into the system on demand when the system pressure falls below a certain value.

An important safety feature inherent in the aircraft control system set forth above is that if failure of both the normal and alternate systems should occur control surface 1 will not be buffeted about due to aerodynamic forces on the control surface. Heretofore, complete failure of an aircraft control system has meant that the forces on the control surface would violently batter and shake the control surface resulting in quick destruction of the surface and thus of the airplane. If complete failure of the two hydraulic systems should occur in our improved aircraft control system, however, the control surface will be held rigidly in position despite external forces thereon. This is because of the unique action of the control valves and of the check valves associated with the hydraulic cylinders. Thus if the pressure in lines 38 and 138 should both fail while the unit is in the position illustrated in Fig. 2, cylinders 21 and 121 can not move downwardly more than a very short distance because this will cause slide members 19 and 119 to cover access ports 33 and 34, and 133 and 134 to the cylinders, thus shutting off the valve and locking fluid within the two cylinders. Should the cylinders be urged upwardly by the forces on the control surface, check valves 42 and 142 will prevent displacement of fluid from the lower portion of the cylinder, precluding movement of the cylinders in an upward direction. This not only provides for rigid positioning of control surface 1 in the event of failure of both hydraulic systems, but it will permit a limited amount of controlled movement of surface 1. The control valves can be moved so as to permit bleeding of fluid from the valves such as to permit the control surface to move in the direction in which it is urged by aerodynamic forces. Thus, for example, if forces on control surface 1 are moving the leading edge thereof downwardly, control valve slides 19 and 119 may be moved so that they are maintained in a position such as shown in Fig. 2 to permit egress of fluid from the upper portions of the hydraulic cylinders without thereafter closing off the valve ports. The aerodynamic forces on control surface 1 can then move that surface downwardly until it is chosen to move slides 19 and 119 so as to close off the ports to and from the cylinders. Operation may be similar, of course, for upward forces on the control surface.

It can thus be seen that by the teachings of this invention we have provided an improved aircraft control system that is completely power operated, is irreversible in its characteristics and provides for maximum maneuverability by providing for pivotal movement of an entire tail surface. The system includes an artificial feel unit and, in addition, the safety features of an auxiliary power system automatically operable in case of failure of the normal hydraulic system. It should be clearly understood that the foregoing detailed description is given for purposes of illustration only and is not to be taken by way of limitation, the spirit and scope of this invention being limited only by the appended claims.

We claim:

1. An aircraft control system for effecting movement of a pivotally mounted control surface comprising two alternately operable hydraulic units, each unit including a source of pressurized fluid, a driven member connected with said source of pressurized fluid and with said control surface for effecting pivotal movement thereof in response to said pressurized fluid, and a manually operable control valve for controlling the application of such pressurized fluid to said driven member, a single pilot-operated control linkage interconnected with both of said control valves for operating the same, check valve means in each of said units for preventing transmission to said control linkage of forces imposed on said control surface, and power operable shutoff valve means interposed between each of said driven members and the source of pressurized fluid therefor, said shutoff valve means for one of said hydraulic units including a pressure sensitive means connected in said unit and sensitive to the pressure supplied by the source of pressurized fluid therefor, said pressure sensitive means including means operatively connected to both of said shutoff valve means for closing the shutoff valve means in the unit with which said pressure sensitive means is associated when the pressure supplied by the source of pressurized fluid therefor falls below a predetermined value and simultaneously opening the shutoff valve means of the other of said hydraulic units.

2. An irreversible control system for an aircraft having a principal tail member pivotally secured to said aircraft, said system comprising two alternately operable hydraulic units connected with said tail member for effecting pivotal movement thereof, each of said units including a pressure responsive device connected with said tail member, a source of fluid pressure connected with said pressure responsive device for effecting operation thereof, a control valve interposed between said source of fluid pressure and said pressure responsive device for directing the application of such fluid pressure, and check valve means associated with said pressure responsive device for preventing reverse flow of fluid therethrough, a single pilot-operated control linkage connected with the control valve of both of said hydraulic units for effecting equal and simultaneous movement thereof, said linkage including resilient means for resisting movement thereof, and pressure sensitive means connected with the first of said hydraulic units, said pressure sensitive means being responsive to pressure in said first of said hydraulic units and connected with each of said shutoff valves, said pressure sensitive means including valve operating means for closing the shutoff valve in said first hydraulic unit and opening the shutoff valve in the other of said hydraulic units when the pressure in said first hydraulic unit falls below a predetermined value.

3. An irreversible control system for an aircraft comprising a principal tail member pivotally secured to and carried by said aircraft, and means for pivoting said tail member, said means including a pair of axially aligned movable hydraulic cylinders connected with said tail member, a fixed piston in each of said cylinders, a rod interconnecting said pistons, two sources of pressurized fluid, said sources being connected one to each of said cylinders, a control valve interposed between each of said cylinders and the source of pressurized fluid therefor and operable for directing pressurized fluid to either side of said pistons for thereby effecting displacement of the cylinders and causing pivotal movement of said tail member, check valve means interposed between each control valve and the source of pressurized fluid therefor for preventing reverse flow, a single pilot-operated control linkage connected with both of said control valves for effecting simultaneous and equal action thereof, a shutoff valve between each of said sources of pressurized fluid and the cylinder therefor, and pressure sensitive means interposed between the source of pressurized fluid and the control valve means for one of said cylinders, said pressure sensitive means including an electrically energized power driven connection to each of said shutoff valves, said pressure sensitive means being sensitive to pressure produced by the source of pressurized fluid with which the same is associated, and including means to operate said power driven connections to close the shutoff valve means in the unit with which said pressure sensitive means is associated when the pressure therein is below a predetermined value, while simultaneously opening the other shutoff valve.

4. An aircraft control system comprising a principal tail member pivotally connected to an aircraft, two individually and alternately operable hydraulic systems connected to said tail member for effecting pivotal operation thereof, each of said systems including a source of pressurized fluid, hydraulic cylinder means connected with said tail surface for pivotally moving same, means interconnecting said source of pressurized fluid and said hydraulic cylinder means, control valve means connected to said hydraulic cylinder means for controlling admission of pressurized fluid thereto, and a shutoff valve in said connecting means, a single pilot operated linkage connected to both of said control valve means for operating the same, and power operated pressure sensitive means connected with both of said shutoff valves, said pressure sensitive means being sensitive to pressure in one of said connecting means and operable to close the shutoff valve in the system with which said connecting means is associated when the pressure therein is below a predetermined value, and simultaneously to open the other of said shutoff valves.

References Cited in the file of this patent

UNITED STATES PATENTS

| | | |
|---|---|---|
| 2,140,037 | Swisher | Dec. 13, 1938 |
| 2,396,984 | Broadston et al. | Mar. 19, 1946 |
| 2,498,483 | Campbell | Feb. 21, 1950 |
| 2,511,265 | Hoopingarner et al. | June 13, 1950 |
| 2,559,817 | Ashkenas | July 10, 1951 |
| 2,597,419 | Westbury et al. | May 20, 1952 |
| 2,613,890 | Beman | Oct. 14, 1952 |
| 2,616,264 | Grant et al. | Nov. 4, 1952 |
| 2,619,304 | Feeney et al. | Nov. 25, 1952 |
| 2,661,169 | Ashkenas | Dec. 1, 1953 |

FOREIGN PATENTS

| | | |
|---|---|---|
| 479,981 | Canada | Jan. 1, 1952 |
| 643,815 | Great Britain | Sept. 27, 1950 |